United States Patent [19]
Hayakawa et al.

[11] Patent Number: 5,235,483
[45] Date of Patent: Aug. 10, 1993

[54] MAGNETIC HEAD HAVING A GROOVE BETWEEN HIGH AND LOW TRACK DENSITY CORES

[75] Inventors: Yuichi Hayakawa; Hiroshi Tsutsui, both of Tokyo; Makoto Miyazaki; Atsushi Hirano, both of Gunma, all of Japan

[73] Assignee: NEC Corporation, Tokyo, Japan

[21] Appl. No.: 749,343

[22] Filed: Aug. 23, 1991

[30] Foreign Application Priority Data

Aug. 23, 1990 [JP] Japan .................................. 2-222132

[51] Int. Cl.$^5$ ............................................. G11B 5/48
[52] U.S. Cl. ............................. 360/103; 360/99.01; 360/104; 360/122
[58] Field of Search ............................... 360/102–103, 360/104, 122, 99.01

[56] References Cited

U.S. PATENT DOCUMENTS

| 4,888,657 | 12/1989 | Lacey et al. | 360/122 |
| 4,912,582 | 3/1990 | Gomi et al. | 360/99.01 |

FOREIGN PATENT DOCUMENTS

| 59-16119 | 1/1984 | Japan | 360/122 |
| 59-213013 | 12/1984 | Japan | 360/122 |
| 61-80608 | 4/1986 | Japan | 360/122 |

*Primary Examiner*—John H. Wolff
*Attorney, Agent, or Firm*—Sughrue, Mion, Zinn, Macpeak & Seas

[57] ABSTRACT

A magnetic head device incorporated in magnetic recording and playback equipment for recording and reproducing information from a magnetic disk. The device has a magnetic head which is formed with a plurality of grooves in the surface thereof that is to face a magnetic disk. The grooves reduce the friction acting between the head and the disk during operation and thereby allows the head to slide on the disk stably with a minimum of spacing loss.

2 Claims, 3 Drawing Sheets

5,235,483

MAGNETIC HEAD HAVING A GROOVE BETWEEN HIGH AND LOW TRACK DENSITY CORES

BACKGROUND OF THE INVENTION

The present invention relates to a magnetic head device incorporated in magnetic recording and playback equipment and, more particularly, to a magnetic head device capable of reducing the friction thereof with respect to a magnetic recording medium as well as the spacing loss.

Magnetic recording and playback equipment operable with a magnetic recording medium has been proposed in various forms in the past. This kind of recording and playback equipment has a magnetic head device for writing and reading information out of a magnetic recording medium such as a floppy disk or diskette. For example, conventional equipment capable of recording and reproducing information from both sides of a floppy disk has a magnetic head device made up of a pair of magnetic head which are located to face each other with the floppy disk therebetween. Each magnetic head has two sliders, a core for low track density and a core for high track density held between the sliders, and a spacer held between the cores. One of the sliders has a center groove on the surface thereof that faces the disk. The center groove extends in the pitch direction of tracks formed on the disk. The problem with this kind of configuration is that the surface of each head that faces a disk contacts the disk over the entire area thereof except for the center groove. This increases the friction to thereby bring about a stick slip phenomenon. As a result, it is difficult to allow each head to slide stably on the disk while reducing the spacing loss.

SUMMARY OF THE INVENTION

It is therefore an object of the present invention to provide a magnetic head device whose magnetic heads slide stably on a magnetic disk with a minimum of spacing loss.

It is another object of the present invention to provide a generally improved magnetic head device.

A magnetic head device for recording and reproducing information from a magnetic recording medium of the present invention has first and a second slider blocks each having a surface which faces the magnetic recording medium and an area which is different from the area of the other slider block, a core for low track density and a core for high track density each having a surface that faces the magnetic recording medium and integrally held between the first and second slider blocks, and a spacer having a surface that faces the magnetic recording medium and held between the cores. The surfaces of the first and second slider blocks, the surfaces of the cores and the surface of the spacer constitute the surface of the magnetic head that faces the magnetic recording medium. A center groove is formed in the surface of the first slider block which substantially corresponds to the center of the surface of the magnetic recording head. Further, a groove is formed in at least a part of the surface of the spacer of interest.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
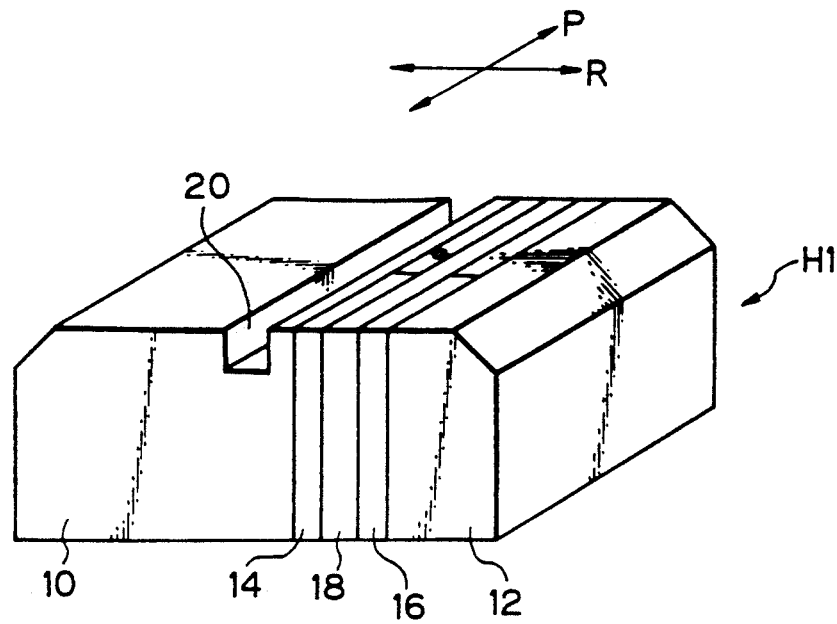
FIG. 1 is a perspective view of a conventional magnetic head device, particularly one of two magnetic heads thereof that is located below a magnetic disk.

To better understand the present invention, a brief reference will be made to a prior art magnetic head device, particularly a magnetic head device incorporated in a floppy disk apparatus, shown in FIGS. 1 and 2. As shown in FIG. 1, the magnetic head device has a magnetic head H1 which faces another magnetic head H2, FIG. 2, with the intermediary of a floppy disk FD, FIG. 2. Specifically, the magnetic head H1 is located below the floppy disk FD. The magnetic heads H1 and H2 have substantially the same configuration as each other.

Figure 2:
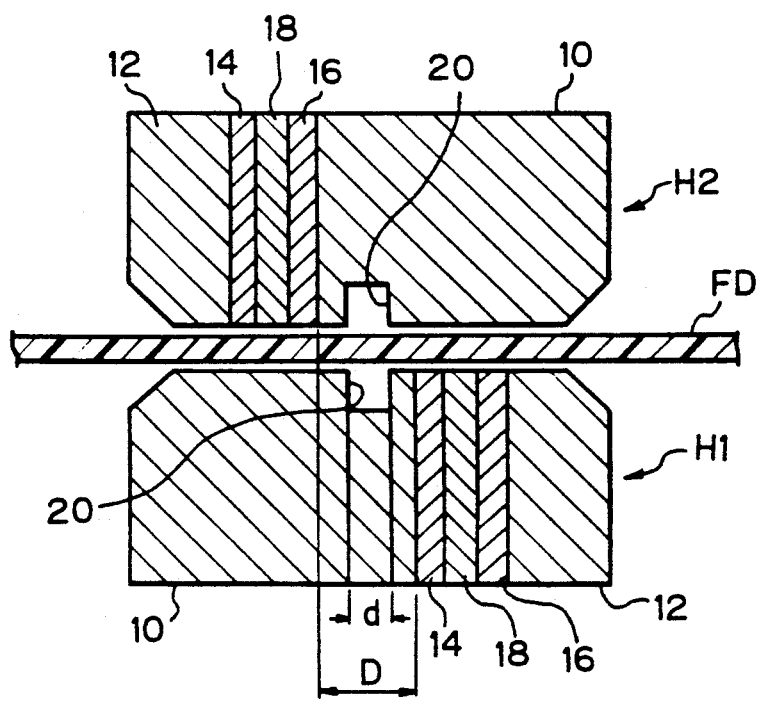
FIG. 2 is a section showing the configuration and positional relation between the two magnetic heads of the conventional device.

As shown in FIGS. 1 and 2, the magnetic head H1, for example, has a first slider block 10, a second slider block 12, a core 14 for low track density, and a core 16 for high track density. The first slider 10 is elongated in a roll direction R shown in FIG. 1 and includes the central area of the surface of the head H1 that faces the lower surface of the floppy disk FD. The second slider block 12 is shorter in the roll direction R than the first slider block 10. The two cores 14 and 16 are held between the first and second slider blocks 10 and 12. A spacer 18 is interposed between the cores 14 and 16. As shown in FIG. 2, the cores 14 and 16 are provided on the slider blocks 10 and 12, respectively. The other magnetic head H2 has such cores 14 and 16 on the slider block 12 and 10, respectively. In each of the magnetic heads H1 and H2, the first slider block 10 is formed with a center groove 20 on the surface thereof which faces the floppy disk FD. The center groove 20 is situated in the central area of the surface of the head H1 or H2 and extends in a pitch direction P, FIG. 1. As shown in FIG. 2, the center grooves 20 each have a width d as measured in the roll direction R and lie in the range D between the two cores 14 and 16 as measured in the same direction R.

As described above, the conventional magnetic head device has to have at least two slider blocks 10 and 12, two cores 14 and 16 and spacer 18 arranged side by side such that they face the floppy disk FD. Hence, it is difficult to reduce the length, as measured in the roll direction R, of the surface of the head H1 or H2 that faces the floppy disk FD. Moreover, since the heads H1 and H2 each contacts the floppy disk FD over the entire surface thereof except for the center groove 20, the friction is increased and the stick slip phenomenon may occur. This phenomenon prevents the head H1 and H2 from contacting the floppy disk FD stably with a minimum of spacing loss, as discussed earlier.

Figure 3:
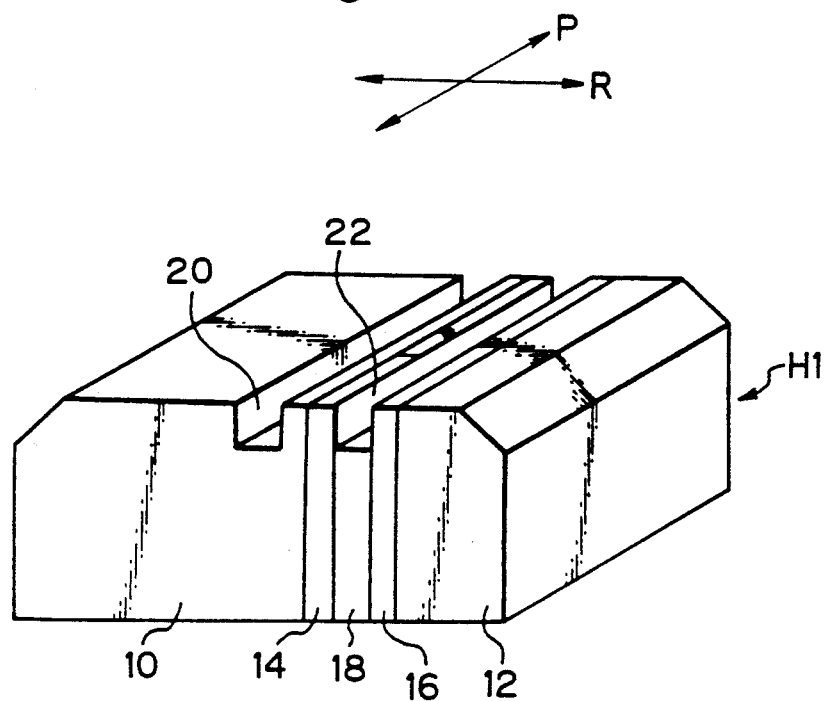
FIG. 3 is a perspective view showing a magnetic head device embodying the present invention, particularly one of two magnetic heads thereof which is disposed below a magnetic disk.
Figure 4:
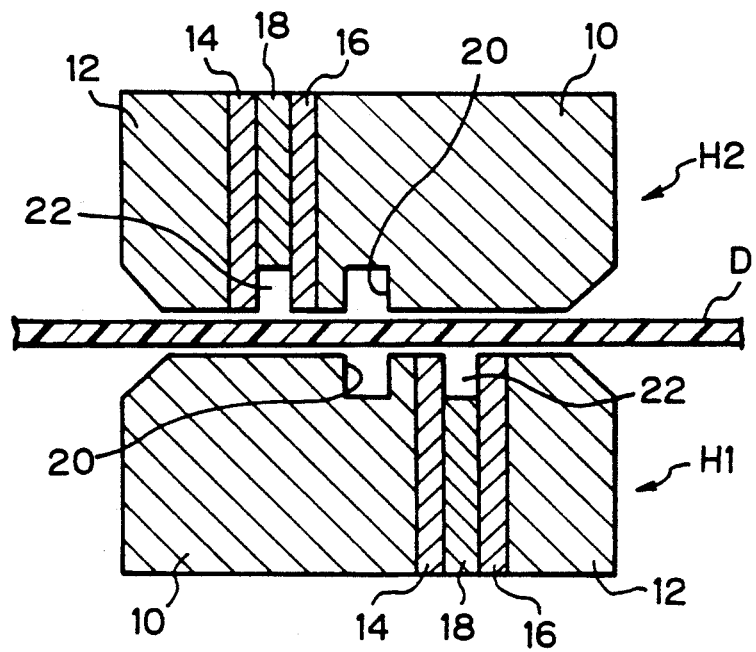
FIG. 4 is a section representative of a positional relation between the magnetic head included in the illustrative embodiment.

Referring to FIGS. 3 and 4, a magnetic head device embodying the present invention is shown. In the figures, the same or similar components and elements are designated by like reference numerals, and redundant description will be avoided for simplicity. As shown, a pair of magnetic heads H1 and H2 are located to face each other with the intermediary of a floppy disk D, and each has cores 14 and 16 respectively assigned to low track density and high track density, a spacer 18, and first and second slider blocks 10 and 12. Each slider block 10 is formed with a center groove 20.

In the illustrative embodiment, a groove or notch 22 is provided on the surface of each spacer 18 that would otherwise contact the disk D. The groove 22 reduces the contact area of each head H1 or H2 with the disk D due to the open end thereof. As a result, the effective length over which each head H1 or H2 contacts the disk is reduced in a roll direction R, FIG. 3, to in turn reduce the dynamic friction. This allows the heads H1 and H2 to slide on the disk D stably with a minimum of spacing loss.

Figure 5:
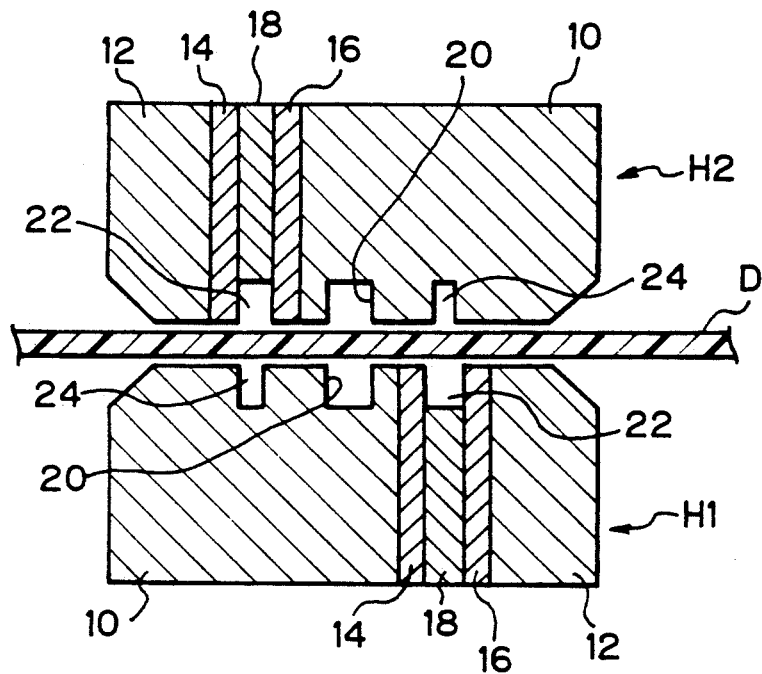
FIG. 5 is a section showing an alternative embodiment of the present invention.

FIG. 5 shows an alternative embodiment of the present invention which is essentially similar to the above embodiment except for another groove or notch 24 formed in each slider block 10. Specifically, the groove 24 is formed in the surface of each slider 10 that contacts the disk D, in addition to the groove 22 of the spacer 18. The groove 24 is substantially symmetrical with the groove 22 with respect to the center groove 20. This is successful in further reducing the area over which the heads H1 and H2 contact the disk D, compared to the previous embodiment.

Figure 6:
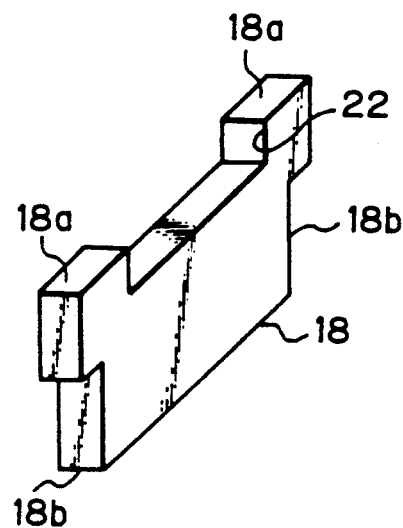
FIG. 6 is a perspective view showing a modification of any one of the illustrative embodiments.

Referring to FIG. 6, a modified form of any one of the previous embodiments will be described which pertains to the configuration of the spacer 18 having the groove 22. As shown, the spacer 18 has contact surfaces 18a at both sides of the groove 22 which is directly formed in the spacer 18. The contact surfaces 18a contact the disk D. Part of the spacer 18 opposite to each contact surface 18a is removed to form a stepped portion 18b to thereby enhance the efficient use of material. The spacer 18 having such a configuration does not have to be machined to form the groove 22 after the associated head H1 or H2 has been assembled. This embodiment, therefore, reduces the number of steps to be performed after the assembly of each head while promoting the efficient use of material.

In the embodiments shown and described, the center groove 20 and grooves 22 and 24 each may have any desired depth and configuration so long as they meet the desired object. It is not necessary for such grooves to extend fully parallel to the pitch direction P, i.e., the gist is that they be interposed between the low track density and high track density cores 14 and 16 located on the surfaces which face opposite sides of a disk.

In summary, it will be seen that the prevent invention provides a magnetic head device having a plurality of grooves on the surface of each magnetic head that is to face a floppy disk or similar recording medium and, therefore, capable of sliding on a recording medium stably with a minimum of dynamic friction between itself and the medium, i.e., with a minimum of spacing loss.

Various modifications will become possible for those skilled in the art after receiving the teachings of the present disclosure without departing from the scope thereof.

What is claimed is:

1. A magnetic head device for recording and reproducing information from a magnetic recording medium, comprising:

a first and a second slider block having first and second surfaces, respectively, which face the magnetic recording medium, the area of said first surface being greater than the area of said second surface;

a core for low track density and a core for high track density each having a surface that faces the magnetic recording medium each of said cores being integrally held between said first and second slider blocks;

a spacer having a surface that faces the magnetic recording medium, said spacer being held between said cores;

said first and second surfaces of said first and second slider blocks, said surfaces of said cores and said surface of said spacer constituting the surface of a magnetic head that faces the magnetic recording medium;

a center groove formed in said first surface of said first slider block at a position which substantially corresponds to the center of said surface of said magnetic recording head; and a spacer groove formed in at least a part of said surface of said spacer.

2. A device as claimed in claim 1, further comprising an auxiliary groove formed in said first surface of said first slider block symmetrically to said spacer groove with respect to said center groove.

* * * * *